United States Patent [19]
Weisburn et al.

[11] Patent Number: 5,285,918
[45] Date of Patent: Feb. 15, 1994

[54] VIDEOCASSETTE SHIPPING CONTAINER

[75] Inventors: James T. Weisburn, Massillon; Ronald K. Burdett, Strasburg; Christopher G. Gallagher, Akron, all of Ohio

[73] Assignee: Alpha Enterprises, Inc., Canton, Ohio

[21] Appl. No.: 988,894

[22] Filed: Dec. 10, 1992

[51] Int. Cl.⁵ .................... B65D 43/16; B65D 43/22
[52] U.S. Cl. ............................ 220/265; 206/1.5; 206/387; 206/807; 220/324
[58] Field of Search .............. 206/1.5, 387, 309, 310, 206/444, 807; 220/265, 315, 324, 326

[56] References Cited

U.S. PATENT DOCUMENTS

| | | | |
|---|---|---|---|
| 3,494,458 | 2/1970 | Meierhoefer | 206/807 |
| 3,635,331 | 1/1972 | Zucker | 220/265 |
| 3,933,381 | 1/1976 | Schurman | 292/57 |
| 4,078,657 | 3/1978 | Schurman | 206/387 |
| 4,105,112 | 8/1978 | Graf | 206/1.5 |
| 4,153,178 | 5/1979 | Weavers | 220/306 |
| 4,231,474 | 11/1980 | Takahashi | 206/387 |
| 4,365,711 | 12/1982 | Long et al. | 206/387 |
| 4,381,836 | 5/1983 | Rivkin et al. | 206/387 |
| 4,512,470 | 4/1985 | Sieben | 206/387 |
| 4,805,769 | 2/1989 | Soltis et al. | 206/387 |
| 4,921,097 | 5/1990 | Finke et al. | 206/387 |
| 5,148,914 | 9/1992 | Budert et al. | 206/1.5 |

FOREIGN PATENT DOCUMENTS 2252959 8/1992 United Kingdom ............... 206/387

Primary Examiner—Jimmy G. Foster
Attorney, Agent, or Firm—Michael Sand Co.

[57] ABSTRACT

A container for shipping and storing an article such as a video cassette has a base formed by a pair of spaced end walls, and a pair of spaced side walls. Integrally molded to the base is a lid having at least one destructible locking tang formed thereon which passes through an aperture formed in one of the side walls of the base. When the locking tang is inserted through the aperture, a shoulder on the tang engages the base wall and may only be disengaged from the wall by destructibly removing the locking tang from the lid. A tear groove preferably is formed in a hinge portion of the tang to facilitate removal of the tang from the lid. Also, provided on the lid and base are a plurality of projections to provide at least one snap-fit engagement between the lid and the base to latch the lid and the base together once the locking tang has been removed. A plurality of shock absorbing tabs are formed in the storage compartment to space the video cassette from the walls to reduce damage thereto during shipment.

14 Claims, 3 Drawing Sheets

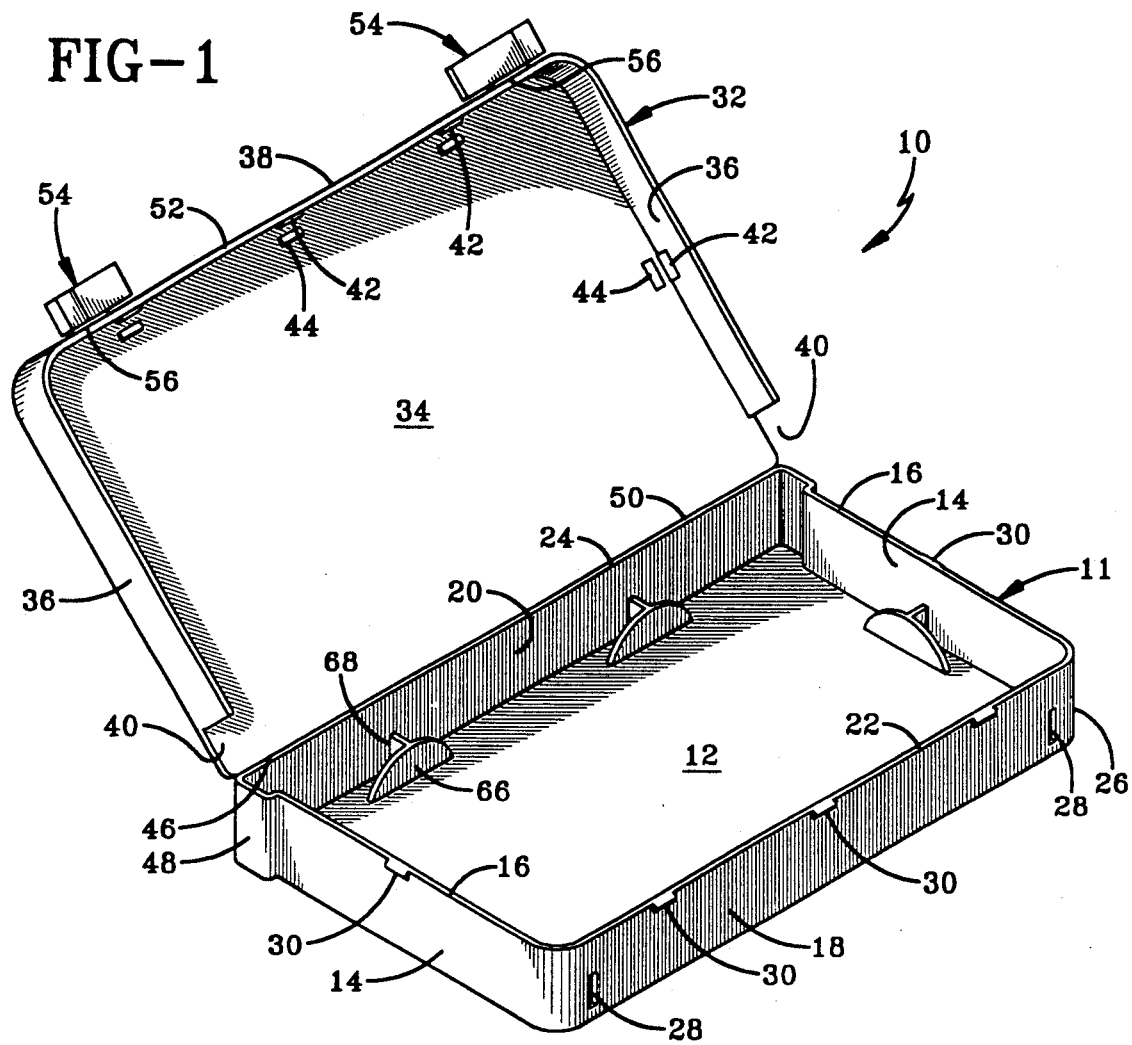
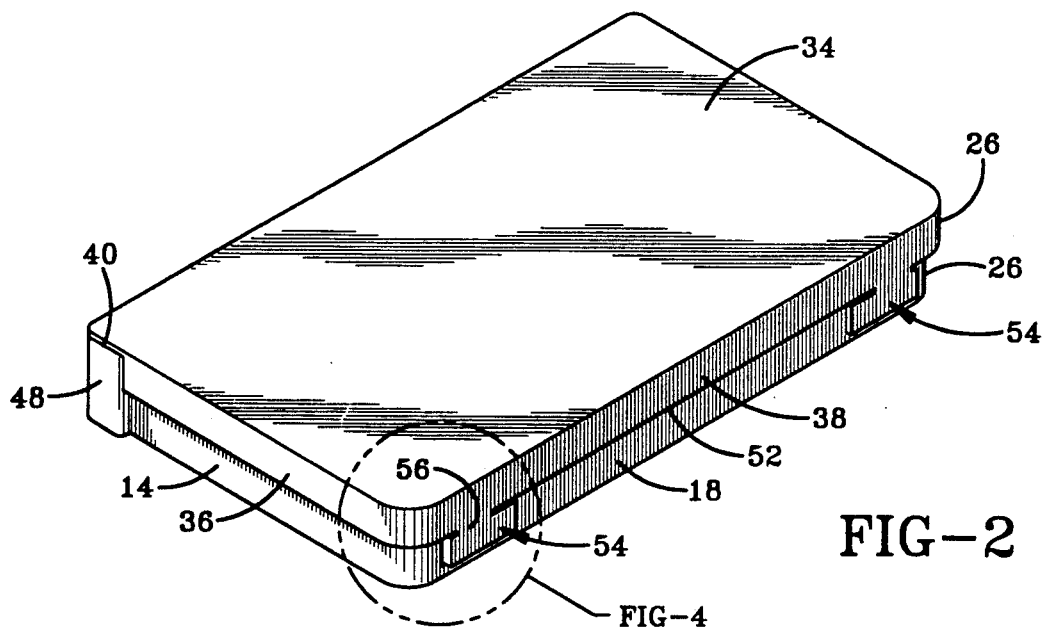

VIDEOCASSETTE SHIPPING CONTAINER

BACKGROUND OF THE INVENTION

Technical Field

The invention relates to containers. Particularly, the invention relates to a storage container for storing and shipping a single videocassette. Specifically, the invention relates to storage and shipping containers for accepting a single videocassette which is permanently locked during shipment and becomes a usual storage container when the customer receives the cassette.

Background Information

The use of videocassettes together with associated equipment is growing in popularity. These cassettes are used primarily to record programs directly from a television for replay, or else they are purchased with a program, movie or the like pre-recorded thereon. It is desirable that these cassettes be shipped and stored in protective boxes or containers to prevent physical damage to the cassette during shipment, as well as to keep the cassette relatively dust free during storage.

The most common type of videocassette containers/shipper used today is the blow molded rectangular shaped plastic box of the type shown in U.S. Pat. Nos. 3,933,381 and 4,153,178. These types of containers have blow molded plastic base and cover portions formed of double wall construction which are hinged together for movement between open and closed positions with respect to one another. A latch assembly is provided for positively locking the cover portion in a closed position. The latch assembly often includes an elongated member which slidably mounts within a trough shaped groove in the front of the cover portion. The cover and base often include formed portions which may engage with one another upon closing of the cover and which include aligned locking apertures. While the prior art shipping containers are presumable adequate for the purpose for which they were intended, several problems created thereby have become apparent. Specifically, the elongated latch members often employed to positively lock the shipping container of the prior art may become disengaged due to rough handling, thereby allowing the container to pop open during shipment. Moreover, once received, the shipping container is bulky for the customer to store, and cannot be easily opened as the slide latch member must be operated each time the cassette is removed therefrom. While double wall construction created by the blow molding process creates a sufficient shock dampener to protect the enclosed cassette, it is more expensive than injection molding container thereby increasing the overall cost of the product.

Thus, despite the existence of the above discussed prior art storage and shipping containers, the need exists for a storage/shipping container which provides a permanently locked container for the cassette during shipping, in which the storage case is easily opened and closed upon receipt by the customer, and which may be easily manufactured by injection molding without compromising the protection afforded the enclosed cassette.

SUMMARY OF THE INVENTION

It is therefore an objective of the present invention to provide an improved container which may be used both for the purpose of shipping a cassette to a customer, as well as for providing the usual storage case for the cassette upon receipt by the customer.

A further objective of the present invention is to provide such a cassette storage/shipping container which is permanently locked during shipping, and which is securely latched for storage by an easily engageable snap-fit latching mechanism upon receipt by the customer.

A still further objective of the invention is to provide a cassette storage device which may be operated easily by the customer.

Yet another objective is to provide a cassette shipper which may be manufactured by injection molding without compromising the shock dampening characteristics which a cassette shipper must have to protect an enclosed videocassette.

It is another objective of the present invention to provide a cassette storage/shipping container which may be easily manufactured as a single integral one-piece unit.

Still another objective of the present invention is to provide such a cassette storage/shipping container which has a relatively simple construction, which achieves the stated objectives in a simple, effective, and inexpensive manner, and which solves problems and satisfies needs in the art.

These and other objectives and advantages of the invention are obtained by the shipping container of the present invention, the general nature of which may be stated as including a base having a storage compartment formed by a pair of spaced end walls and a pair of spaced side walls; a closure lid for said storage compartment; a locking aperture formed in one of the lid and base; a destructible locking tang formed in the other of the lid and base, a portion of said tang being insertable through the aperture for locking said lid and base in a closed position; and means on said locking tangs for destructively removing said tang to permit unlocking of the lid from the base.

BRIEF DESCRIPTION OF THE DRAWINGS

A preferred embodiment of the invention, illustrative of the best mode in which applicants have contemplated applying the principles, is set forth in the following description and is shown in the drawings and is particularly and distinctly pointed out and set forth in the appended claims.

FIG. 1 is a perspective view of the improved videocassette storage/shipping container with the lid open;

FIG. 2 is a perspective view of the improved videocassette storage/shipping container as shown in FIG. 1, with the lid in a closed and locked position:

Similar numbers refer to similar parts throughout the drawings.

DESCRIPTION OF THE PREFERRED EMBODIMENT

Figure 3:
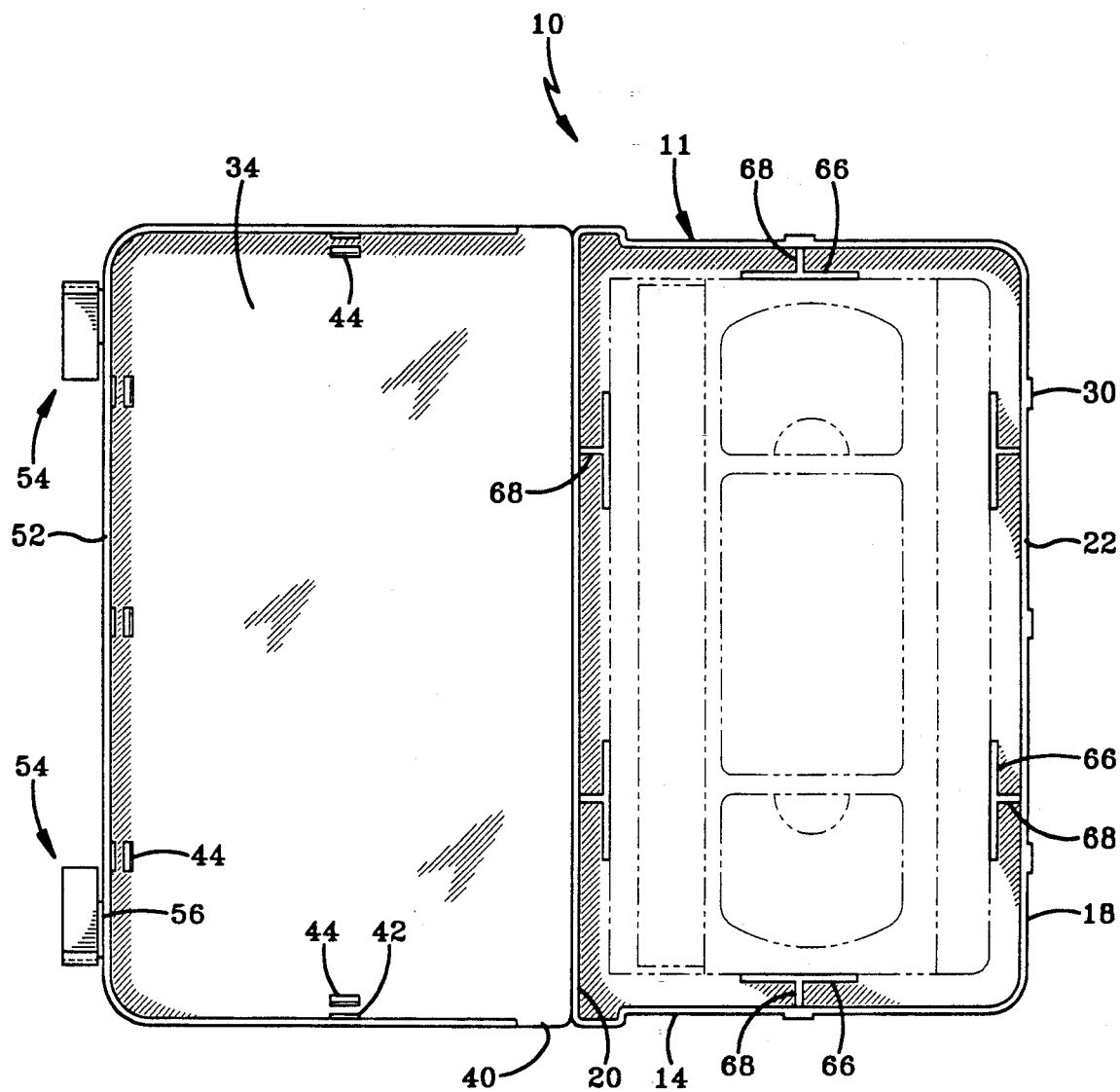
FIG. 3 is a top plan view of the improved videocassette storage/shipping container in full open position showing an enclosed videocassette in phantom.

The improved shipping container is indicated generally at 10, and is shown in FIG. 1 in an open position prior to storing a videocassette therein. Container 10 has a rectangular box-shaped configuration and forms a hollow storage compartment when closed, and preferably is formed of an injection molded plastic material, such as polypropylene. Container 10 includes a base portion 11, which has a rectangular shaped flat bottom wall 12 with upstanding parallel spaced end walls 14, with each of end walls 14 having an upper edge 16. Perpendicular to end walls 14 are spaced parallel front and rear walls, 18 and 20, respectively, having upper edges 22 and 24, respectively. End walls 14 and side walls 18 and 20 are formed integrally with bottom wall 12 and are arranged in a rectangular configuration to enclose all four sides of bottom wall 12, thereby defining the storage compartment. Walls 14, 18 and 20 preferably are positioned along the perimeter of the bottom wall 12. Moreover, front wall 18 adjoins side walls 14 and in arcuate shaped corners 26.

In accordance with the invention, spaced apart elongated apertures 28 extend through front wall 18, preferably adjacent arcuate corners 26. Top edges 16 and 22 are provided with equally spaced, outwardly extending, semi-circular projections 30 which cooperate with similar projections to create a snap-fit engagement as will be described hereinbelow. It should be understood that any configuration of projection 30 could be employed which would create a usual snap-fit engagement without departing from the spirit of the present invention.

Container 10 further includes a lid 32 which has a rectangular box-shaped configuration and forms a hollow enclosure when closed on base portion 11, and preferably is formed of a molded plastic material, such as polypropylene. Lid 32 includes a rectangular shaped closure wall 34 with upstanding parallel spaced apart end walls 36 and a front wall 38 having a free edge 52. Walls 36 and 38 are formed integrally with closure wall 34 and are arranged in a U-shaped configuration to enclose three sides of wall 34. Walls 36 and 38 preferably are positioned along the perimeter or the outer edge of closure wall 34. End walls 36 terminate a short length 40 from a rear edge 46 of lid 32. Length 40 is substantially equal to the length of each of a pair of side bottom projections 48 which extend outwardly from each of end walls 14 adjacent rear wall 20. Projections 48 have a square outer surface and a thickness generally equal to the thickness of the lid walls 36 so that when the lid is closed, the lid end walls 36 will lie in the same plane as the projections 48 to enable the shipper to rest on either side without falling over. As such, the removed portion 40 is substantially complementary to end wall projections 48.

Figure 4:
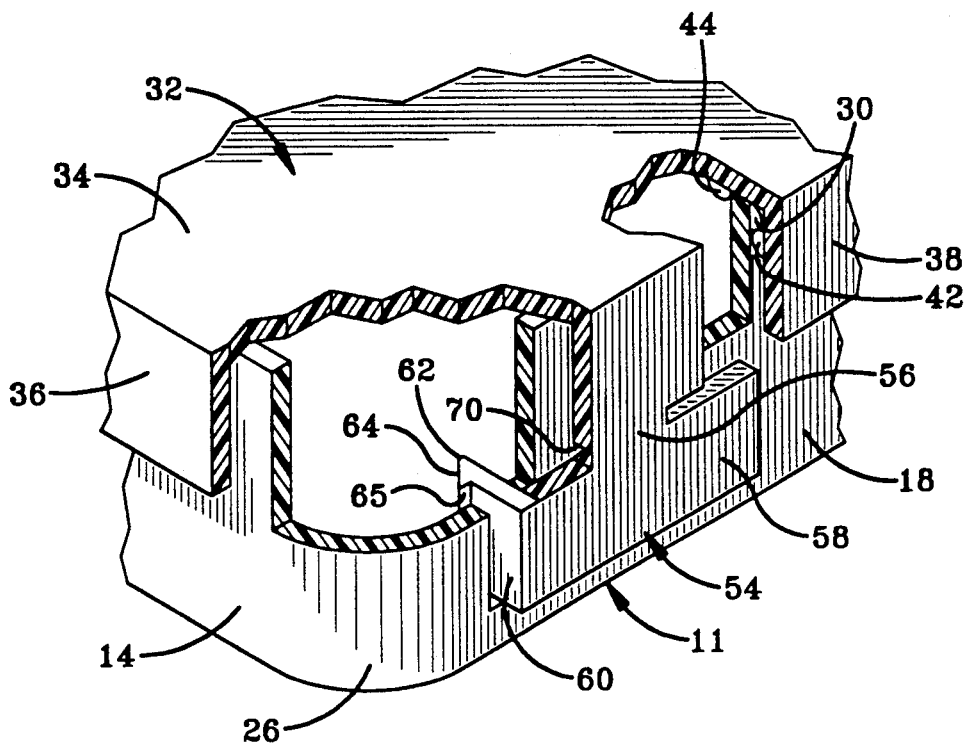
FIG. 4 is a greatly enlarged fragmentary view of the encircled area shown on FIG. 2, in partial cut-away and in section, showing the permanently snap-fit locking arrangement for shipment as well as the releasable snap-fit connection which will be used during storage.

Extending inwardly from lid end walls 36 and lid front wall 38 are equally spaced semi-circular projections 42 (FIG. 4) which are spaced downwardly from closure wall 34 by a distance equal to the width of base projections 30 so that when lid 32 is closed, projections 30 will cam over projections 42 and come to rest in the spaced interposed between projection 42 and closure wall 34. Moreover, and as best seen in FIG. 4, a plurality of equally spaced semicircular projections 44 are integrally molded onto the closure wall 34 a distance from front wall 38 and end walls 36 equal to the total width of either wall 14 or 18 and projection 30. In this manner, when lid 32 is closed, the walls 14 and 18 will be prevented from any inward flexure that would be created by force against the walls 14 and 18. Moreover, projections 44 assure that the semi-circular projections 30 which are molded integrally with walls 14 and 18, stay in constant snap-fit engagement with projections 42.

Preferably, base member 11 and lid 32 are integrally molded as a single piece. As such, top edge 24 of rear side wall 20 and the rear edge 46 of lid 32 are flexibly joined by a living hinge 50 which provides relative opening and closing movement between base member 11 and lid 32.

In accordance with another feature of the invention, two spaced locking tangs indicated generally at 54, are molded integrally with storage container 10, and particularly with free edge 52 of front wall 38, and are connected to front wall 38 via living hinge 56. Tangs 54 are similar to each other, thus only one tang is shown and described in detail. As best seen by FIG. 4, locking tang 54 has a tab 58, to which hinge 56 is connected, and a stem 60 extending orthogonally to tab 58. Stem 60 terminates at a tip 62 which has a camming surface 64 extending outwardly and away from stem 60. Camming surface 64 joins stem 60 by a generally right angle shoulder 65, the purpose for which will be described hereinbelow.

A plurality of tabs 66 are formed integrally on bottom wall 12 within the storage compartment of base 11, and project upwardly therefrom and are preferably secured thereto with one or more reinforcing gussets 68 (FIGS. 1 and 3). Tabs 66 preferably are spaced ⅛ to ¼ inch from end walls 14 and from front and rear walls 18 and 20, to absorb shock imparted against the storage cassette during shipment and to aid the placement of the cassette within the storage compartment. Tabs 66 remain in the shipping container after receipt thereof by the customer. It should be noted that the distance tabs 66 are spaced from the respective side walls or end walls, may be altered without departing from the spirit of the present invention. Tabs 66 can best be viewed in FIG. 3 where there is shown a usual videocassette in phantom, in operative association with the tabs 66. As is evident from FIG. 3, any force applied directly to the side walls or end walls which deflects the affected wall, will not affect the cassette as the space provided between tabs 66 and the wall provides sufficient area for wall flexure. Moreover, the usual jostling of the shipping container during handling will not affect the enclosed videocassette due to the shock absorbing affect of tabs 66.

In further accordance with the invention, hinge 50 provides relative movement of lid 32 between open and closed positions, and when in closed position, end walls 36 and front wall 38 will overlap walls 14 and front wall 18, respectively as shown at FIG. 2. Moreover, when shipping container 10 is closed, as set forth hereinabove, end walls 36 lie in the same plane as rectangular end wall projections 48 to provide a continuous level supporting surface so that shipping container 10 may be set on either end without falling over.

When in the closed and locked position (FIG. 2) stems 60 passes through apertures 28. In one embodiment, apertures 28 are set off slightly from the plane in which stem 60 lies. This offset allows camming surface 64 to contact the outer surface of front wall 18 and flex inwardly until shoulder 65 passes beyond the inner edge of aperture 28 whereupon stressed stem 60 will snap outwardly to assume the position as shown in FIGS. 2 and 4. Shoulders 65 will then engage front wall 18 adjacent apertures 28 and will form a permanent locking connection therebetween. Alternatively, each aperture 28 is formed to be slightly smaller than the total width of the corresponding shoulder 65 and stem 60. As such, when stem 60 is inserted through aperture 28, the front wall 18 which surrounds aperture 28 will flex slightly outward to allow shoulder 65 to pass through and engage front wall 18. In either embodiment, the engagement of shoulders 65 with front wall 18 creates a permanent lock between the lid 32 and base 11 which may only be unlocked by destruction of the locking tang as described hereinbelow.

A second readily disengagable snap-fit latching engagement also is created when lid 32 is closed upon base 11 between semi-circular portions 30 and 42. As lid 32 closes, the semi-circular portions 30 and 42 will act as opposing cam surfaces to allow semi-circular portion 42 to travel over portion 30 and become interposed between portion 30 and lid roof wall 34. This snap-fit engagement thus provides additional security against the disengagement of the lid both during shipment, as well as during storage. Semi-circular portions 44 reduce the likelihood of the snap-fit disengaging from a force directly contacting side walls 14 or front wall 18 as described hereinabove.

Figure 5:
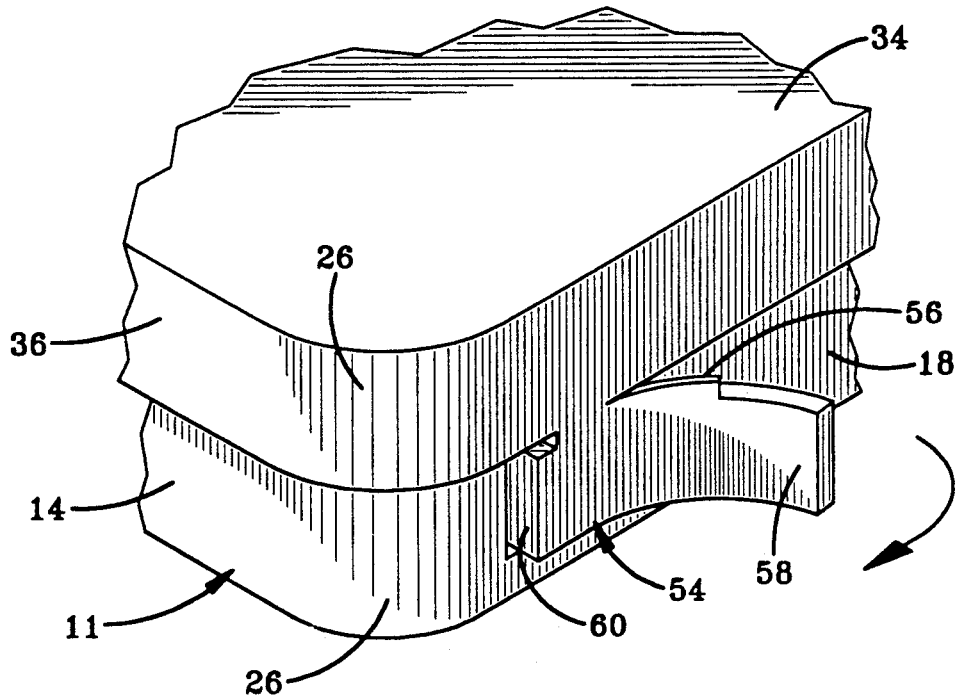
FIG. 5 is a fragmentary view similar to FIG. 4 of the permanent locking tab in a partially removed position.

As is evident from the description hereinabove, during shipment the present storage container is securely and permanently fastened in a closed locked position. However, upon receipt by a purchaser or customer, storage container 10 may be used as the usual storage container for the videocassettes shipped therein. After a customer receives the storage container with an enclosed videocassette usually by mail, shoulders 65 of locking tangs 54 firmly engaged within aperture 28, the customer will take hold of tabs 58 and pull laterally outwardly as is shown particularly in FIG. 5, thereby tearing tabs 58 along hinges 56. Hinge 56 preferably will have a tear groove 70 formed thereon (FIG. 4) and will easily tear from lid 32 upon the customer pulling at tab 58 creating a point load at the point of connection closest to the pulling force. As such, a significant force on a very small area of the hinge will cause hinge 56 to be forcibly torn from lid 32.

Upon complete disengagement, lid 32 will only be held in position on base 11 by the snap-fit relation between the semi-circular portions or projections 30 and 42 which can easily be disengaged by the customer. Upon tearing away tabs 58, the remainder of locking tangs 54 may be pushed easily through apertures 28 and be removed from inside the shipping container and discarded. Alternatively, as the full length of tabs 58 can now be grasped, locking tangs 54 can be forcibly pulled from apertures 28 to be discarded. The customer now has a usual storage container, with the releasable engagement between the lid and the base member being provided by the plurality of easily releasable snap-fit engagements between semi-circular portions 30 and 42 as described hereinabove, which can be used to protect the cassette during storage.

As in evident from the above description, the engagement of shoulder 65 and front wall 18 at each locking tang 54, will create a permanent lock which may only be disengaged by destructively removing tab 58 along tear groove 70. As is also evident, a readily releasable latch is provided by the snap-fit engagement between semi-circular portions 30 and 42.

Accordingly, the improved storage container of the present invention is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved video shipping container device is constructed and used, the characteristics of the device, and the advantageous, new and useful results obtained; the new and useful structures, devices, elements, arrangements, parts and combinations, are set forth in the appended claims.

We claim:

1. A container for storing an article including:
   a base having a storage compartment formed by a pair of spaced end walls and a pair of spaced side walls;
   a closure lid for said storage compartment;
   hinge means for movably connecting the closure lid to the base;
   a locking aperture formed in one of the lid and base;
   a locking tang formed on the other of the lid and base, a portion of said tang being insertable through the aperture into the storage compartment for locking said lid and base in a closed position;
   tab means on said locking tang located exteriorly of the storage compartment for destructive separation from said tang to permit unlocking of the lid from the base; and
   latch means formed on the lid and base for releasably latching said lid and base int he closed position after the locking tang has been destructively separated from the tab means.

2. A container as defined in claim 1 wherein said locking tang has a stem portion which is integrally connected to said tab means and substantially perpendicular thereto, adapted to pass through said aperture.

3. A container as defined in claim 2 wherein said stem has a tip at a free end thereof with a camming surface extending outwardly therefrom which joins said stem at an extending shoulder, said stem being flexed by engagement of said camming surface with a portion of the base or lid surrounding said aperture, thereafter returning toward its original position, with said shoulder engageable with said portion of the base or lid.

4. A container as defined in claim 1 wherein said lid and said base are integrally molded as a single unit, with the hinge means being a living hinge providing relative movement therebetween.

5. A container as defined in claim 1 wherein said lid and said locking tang are integrally molded with a tear groove providing relative movement therebetween.

6. A container as defined in claim 1 including means formed on the base for absorbing shock to protect the enclosed article.

7. A container as defined in claim 6 wherein said means to absorb shock is provided by at least tow upwardly extending tabs molded integrally with said base.

8. A container as defined in claim 7 wherein each of said upwardly extending tabs are supported by at least one gusset spaced between said tab and an adjacent wall of the base.

9. A container as defined in claim 1 wherein the latch means is a snap-fit latch provided between said lid and said base for releasable securing the lid in the closed position.

10. A container as defined in claim 9 wherein said snap-fit latch is created by a first camming member provided on said lid and a second camming member provided on said base which slide over each other when said lid is moved to the closed position.

11. A container as defined in claim 10 wherein said snap-fit latch also includes a blocking projection formed on said lid which is spaced from said camming surface to trap an edge of one of the base side walls therein to prevent the inward movement of said one side wall.

12. The container defined in claim 1 in which the aperture is formed in one of the base side walls; in which the locking tang is formed on the lid and includes a locking tip, said tip being insertable through the aperture; in which a tear groove is formed on the tang for destructively removing said tang from the tab means; and in which said tear groove hingedly connects the tang to the lid.

13. The container defined in claim 12 in which the locking tip includes a camming surface to facilitate insertion of the tip through the aperture, and a shoulder preventing removal of said tip from the aperture.

14. The container defined in claim 1 in which two locking apertures are formed in a spaced relationship in one of the base walls; and in which two locking tangs are joined to the lid by tear grooves which provide for the destructive separation of the tangs.

* * * * *